United States Patent [19]

Zaydel et al.

[11] 4,438,971

[45] Mar. 27, 1984

[54] METHOD AND APPARATUS FOR PLASTIC BODY PANEL ATTACHMENT

[75] Inventors: Wieslaw S. Zaydel, Rochester; Hulki Aldikacti, Orchard Lake; James G. Bouck, Clarkston, all of Mich.

[73] Assignee: General Motors Corporation, Detroit, Mich.

[21] Appl. No.: 418,200

[22] Filed: Sep. 15, 1982

[51] Int. Cl.³ .............................................. B62D 27/02
[52] U.S. Cl. .................................. 296/191; 296/31 P; 29/526 R
[58] Field of Search ............... 296/185, 187, 191, 194, 296/195, 197, 203, 31 P; 29/526 R, 469

[56] References Cited

U.S. PATENT DOCUMENTS

| | | | |
|---|---|---|---|
| 3,423,122 | 1/1968 | Wessells | 296/185 |
| 3,875,661 | 4/1975 | Ledstrom et al. | 296/191 |
| 4,153,290 | 5/1979 | Barenyi et al. | 296/191 |
| 4,186,476 | 2/1980 | Mair et al. | 29/407 |
| 4,382,626 | 5/1983 | Spooner | 296/31 P |

Primary Examiner—Robert R. Song
Attorney, Agent, or Firm—Charles E. Leahy

[57] ABSTRACT

Method and apparatus for attachment of a plastic body outer panel on a dimensionally variable underlying body structure includes a plurality of plastic filled attachment blocks welded at selected points on the body structure to approximately align with apertured mounting faces previously provided on the plastic panels. The body structure is mounted within a locating and machining fixture and each of the plurality of attachment blocks are milled to provide panel support face on each attachment block precisely dimensioned relative panel support faces on each other attachment block. A fastener hole is drilled in the panel support face of each attachment block at a precise location relative the fastener hole drilled in each of the other panel support faces. The body structure is removed from the fixture and the plastic panels are attached thereto by installing fasteners through apertured mounting faces of each panel and through the fastener holes. The precise drilled location of the fastener holes cause each of the plastic panels to be precisely located and spaced relative the adjacent plastic panels. The fasteners hold the mounting faces of the plastic panels in contact with the precisely machined panel support faces of the attachment blocks so that each body outer panel is mounted without distortion of its visible outer surface and the surface of each of the plastic panels is mounted in precise surface alignment with each adjacent plastic panel.

2 Claims, 8 Drawing Figures

METHOD AND APPARATUS FOR PLASTIC BODY PANEL ATTACHMENT

The invention relates to the attachment of decorative plastic body outer panels upon a self-supporting body structure and more particularly provides a method and apparatus including machinable attaching blocks machined and drilled to a precise dimension to provide distortion free attachment and precise alignment and spacing of the plastic body outer panels on the body structure.

BACKGROUND OF THE INVENTION

Conventional motor vehicle bodies are comprised of a plurality of stamped metal panels which are welded, bolted, or otherwise suitably attached together. Such vehicle body construction typically includes body outer panels which define the decorative outer appearance surface of the vehicle and various body inner structural panels and reinforcements which define the underlying body structure and cooperate with the outer panels to carry the loads to which the vehicle is subjected during use. Outer panels, such as the fenders, are conventionally bolted onto the body structure and have slotted holes by which the mounted location of the outer panels may be adjusted to properly space the outer panels from one another. Shims are conventionally placed between the fenders and the body structure to align the appearance surfaces of the adjacent panels irrespective of dimensional variation in the body structure.

It is also known in modern vehicle construction to employ body outer panels of molded plastic in order to obtain vehicle design goals such as weight reduction and corrosion resistance. Furthermore, relatively soft and flexible plastic body outer panels lessen the vehicle's susceptibility to damage from minor impact.

A shortcoming of the use of plastic body outer panels to define the outer appearance surface of a motor vehicle body is that the plastic panel cannot be welded to the adjacent panels or to the underlying self-supporting body structure. Furthermore, the attachment of the plastic panel to the body structure can result in highly visible surface distortion of the plastic panel unless the body outer panel is mounted on the body structure in a precise manner in which the relatively flexible plastic panel is not twisted or bent.

It would be desirable to provide an attachment of the plastic outer body panel upon the body structure by a device and in a manner which assures distortion free mounting of the plastic body outer panel on the underlying body structure and also assures the precise alignment and spacing of each such plastic body outer panel with the adjacent plastic panels irrespective of manufacturing tolerance and dimensional variations in the underlying body structure.

SUMMARY OF THE INVENTION

The invention provides an attachment block to enable attachment of a plastic body outer panel on an underlying self-supporting body structure and includes a stamped metal housing having a base adapted for attachment on the body structure. The housing has tubular walls projecting from the base to provide a cylindrical end face defining an open container mouth. A curable epoxy type plastic fills the container to the cylindrical edge face and cooperates therewith to define a panel support face. A plurality of such machinable attachment blocks are welded or otherwise suitably mounted at selected points on the body structure to approximately align with apertured attachment faces previously provided on the plastic panels.

The self-supporting body structure is mounted within a locating and machining fixture and the panel support faces of each of the plurality of attachment blocks are milled so that the panel support face of each such attachment block is precisely dimensioned relative each of the other panel support faces. A fastener hole is drilled in the panel support face of each attachment block at a precise location relative the fastener hole drilled in each of the other panel support faces. After the body structure is removed from the locating and machining fixture, the plastic panels are attached to the vehicle body structure by installing fasteners such as screws or bolts through the aperture of the plastic panel mounting faces and through the fastener holes drilled in the attachment blocks. The precise location of the fastener holes drilled in the panel support faces cause each of the plastic panels to be precisely located and spaced relative the adjacent plastic panels. The fasteners hold the mounting faces of the plastic panels in contact with the precisely machined panel support faces of the attachment blocks so that each body outer panel is mounted without distortion of its visible outer surface and the surface of each of the plastic panels is mounted in precise surface alignment with each adjacent plastic panel.

Accordingly, one object, feature and advantage of the invention resides in the provision of attachment blocks including a stamped metal housing defining a cavity filled with plastic and cooperating to define a panel support face machinable to precise height and planar relationship and providing a field for the drilling of a hole and installation of a fastener to secure a body outer panel on the attachment block.

Another object, feature and advantage resides in the method of assembling a motor vehicle body including steps of attaching dimensionally oversized attachment blocks at selected points on the vehicle body understructure, machining the blocks to a precise dimension relative each of the other blocks, and attaching body outer panels up on the machined face of the attaching blocks.

A further object, feature and advantage of the invention resides in the method for assembling a plurality of decorative plastic panels on a dimensionally variable vehicle body understructure comprising the steps of attaching a plurality of oversized attaching blocks on the structure, mounting the body structure in a locating fixture, milling the plurality of attaching blocks to provide body panel and support faces precisely located relative one another, drilling fastener holes in each of the blocks at precise dimensions relative holes drilled in each of the other attaching blocks and then installing a plurality of fasteners through previously provided holes in each of the plastic outer panels and through the drilled fastener holes of the attachment blocks so that the plastic outer panels are attached to the body structure in precisely spaced and aligned relationship with each adjacent outer panel.

A still further object, feature and advantage resides in the provision of a vehicle body in which an attachment block has a stamped metal housing with a base and a cylindrical projecting wall defining a plastic filled cavity and attached to the vehicle body structure and being machinable to establish a precisely located body outer panel support face and drillable to provide a fastener hole, and a fastener installed through an aperture of the body outer panel into the drilled hole of the attachment block so that a mounting face of the body outer panel is securely attached to the precisely machined support faces of the attachment blocks to attach the body outer panel on the body structure.

Yet another object, feature and advantage of the invention resides in method for providing distortion free attachment at multiple spaced apart points between a flexible plastic decorative panel and an underlying vehicle body structure by attaching a plurality of dimensionally oversized machinable attaching blocks at each of the attaching points and then machining the blocks to precise height and planar relationship relative each of the other attachment blocks for precise mating with the plastic panels so that fasteners installed through the multiple attaching points of the plastic panels into the attachment blocks mount the plastic panels in distortion free attachment upon the body structure.

DESCRIPTION OF THE DRAWINGS

These and other objects, features and advantages of the invention will become apparent upon consideration of the appended specification and the drawings in which.

DESCRIPTION OF THE PREFERRED EMBODIMENT

Figure 1:
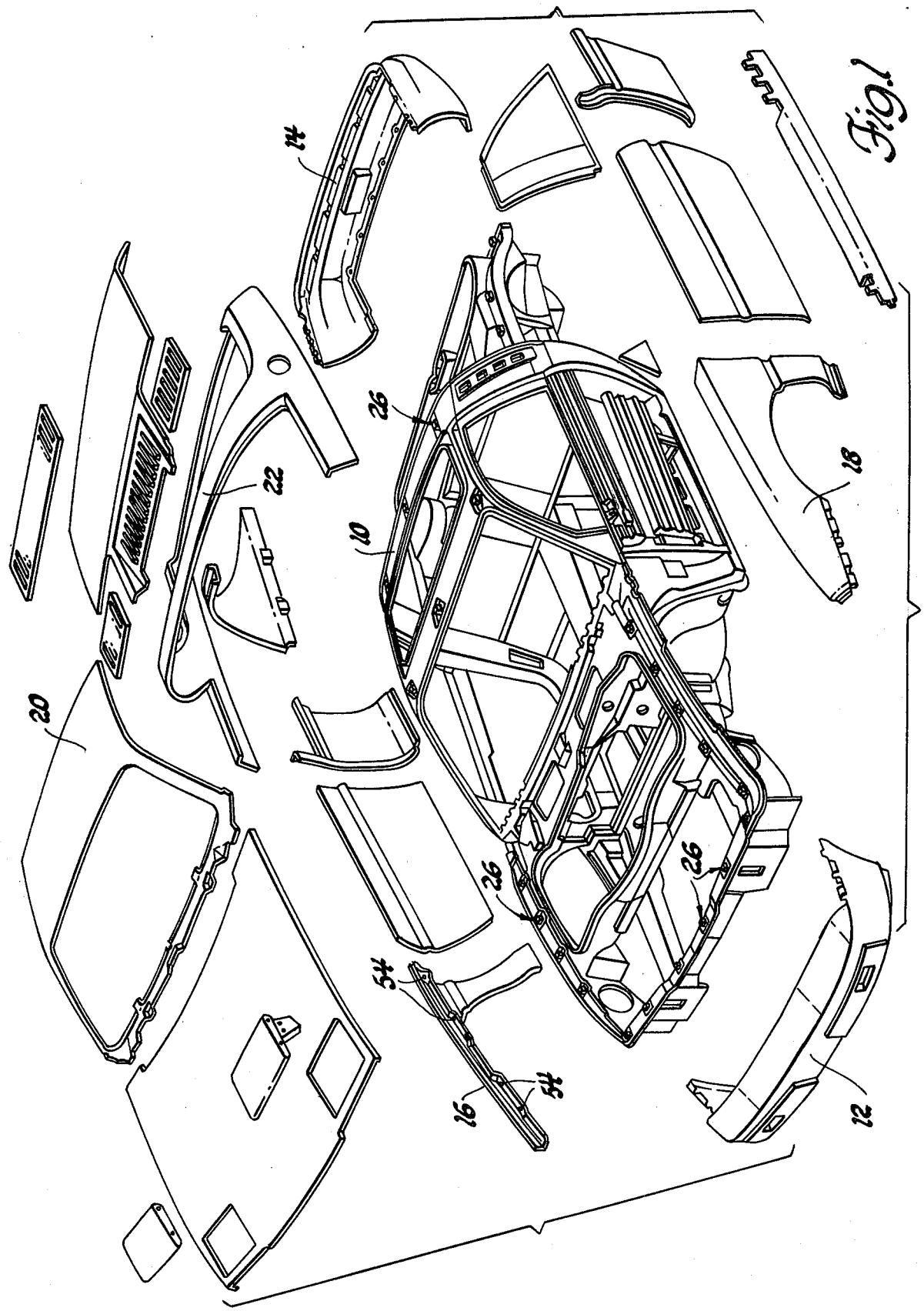
FIG. 1 is an exploded view showing the self-supporting body structure comprised of welded together metal members and a plurality of molded plastic body outer panels for attachment upon the body structure.

Referring to FIG. 1, there is shown an exploded view of motor vehicle having a self-supporting body structure generally indicated at 10 and a plurality of plastic body outer panels which are adapted for mounting on the body structure 10.

The body structure 10 is comprised of a plurality of stamped metal panels which are conventionally welded, bolted or otherwise suitably attached together to define a rigid self-supporting body structure. The body may rest upon a chassis or the front and rear suspensions may be connected directly to the body structure.

The plastic body outer panels may be molded using many types of plastic molding technology. For example, the front bumper fascia 12 and the rear bumper fascia 14 are advantageously formed by reaction injection molding and are relatively tough yet somewhat flexible to function as durable bumper and energy management members. The front fenders 16 and 18 are preferably reaction injection molded and have a relatively soft and flexible character to provide a low susceptibility to dings and denting during normal use of the vehicle. The roof cover 20 and the upper roof panel assembly 22 are preferably constructed of sheet molded compound and are relatively more rigid as their location is more protected from dings and dents but advantageously more rigid.

Figure 2:
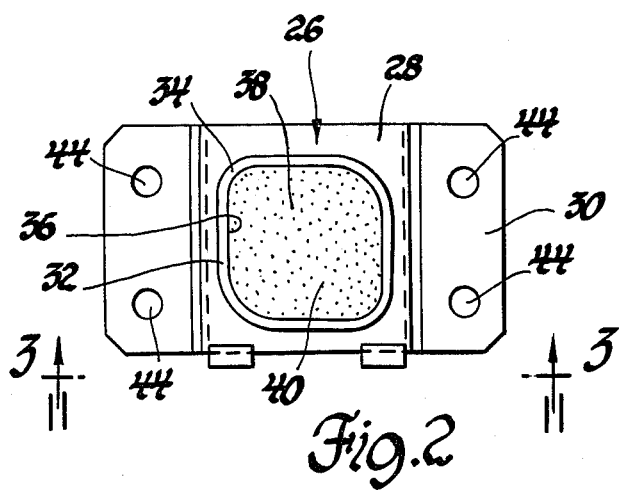
FIG. 2 is a plan view of an attachment block according to the invention.
Figure 4:
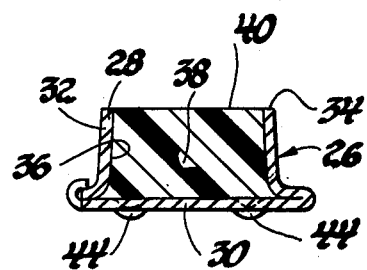
FIG. 4 is a sectional view taken in the direction of arrows 4—4 of FIG. 3.
Figure 3:
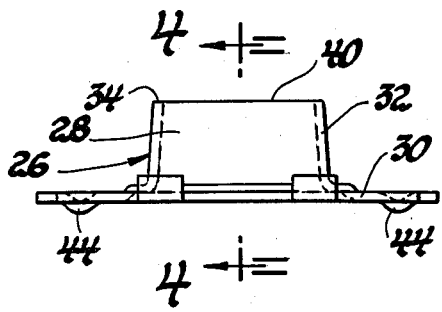
FIG. 3 is a side elevation view of the attachment block taken in the direction of arrows 3—3 of FIG. 2.
Figure 5:
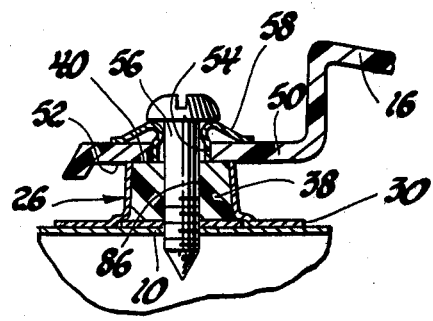
FIG. 5 is a sectional view showing a typical attachment of a plastic fender panel on the body structure.

Referring again to FIG. 1 it is seen that a plurality of attachment blocks 26 are mounted on the body structure 10 at various selected points thereon. As seen in FIGS. 2, 3 and 4, a typical attachment block has a stamped metal housing 28 including a base 30 having a cylindrical wall 32 projecting perpendicularly from the base 30 and terminating at a cylindrical end face 34. The cylindrical wall 32 defines a cavity 36 accessible through an open mouth. A curable plastic 38 such as a fiber filled epoxy plastic fills the cavity 36 and cooperates with the cylindrical end face 34 to define a panel support face 40. The base 30 has dimples 44 which facilitate the projection welding of the base 30 upon the vehicle body structure 10. The attachment blocks 26 may be welded to the body structure 10 after the body structure 10 is assembled from its various constituent stampings as shown in FIG. 1. Alternatively, the attachment blocks 26 may be mounted upon the various constituent metal stampings before the stampings are welded together to define the self-supporting body structure 10. In either case, the attachment blocks 26 are located at selected positions which correspond generally with apertured mounting faces which are provided upon the various plastic body outer panels. For example, with reference to front right fender 16 as shown in FIGS. 1 and 5, the fender 16 has a conventional inwardly offset flange 50 having a planar mounting face 52 which is adapted to overlie and rest upon the panel support face 40 or the attachment block 26. The mounting face 52 of flange 50 is apertured at spaced intervals therealong to define holes or apertures 54 for receiving a fastener.

Referring to FIG. 5, the fender 16 is attached to the body structure 10 and the attachment block 26 by a screw 56 and a ferrule 58. Screw 56 extends through the curable plastic 38 of the attachment block 26, through the base 30 of the attachment block, and through the particular underlying panel of the body structure 10. As seen in FIG. 5, the elevation of the fender 16 will be determined by the elevation of the body structure 10 and by the height of the attachment block 26.

A difficulty encountered in the assembly of the plastic body outer panels to the body structure 10 is that the individual stamping of the plurality of discrete stamped panels which comprise the body structure 10 and the welding processes which are used to assemble the body structure 10 will result in some dimensional variation in the body structure 10. In other words, during mass production of the body structure 10, each will have a somewhat different shape and alignment of the various portions of the body structure with the effect that the panel support faces 40 of the attachment blocks 26 mounted upon the body structure will not always have a consistent elevation and planar orientation for the support and attachment of the mounting faces of the respective plastic body outer panels.

Figure 7:
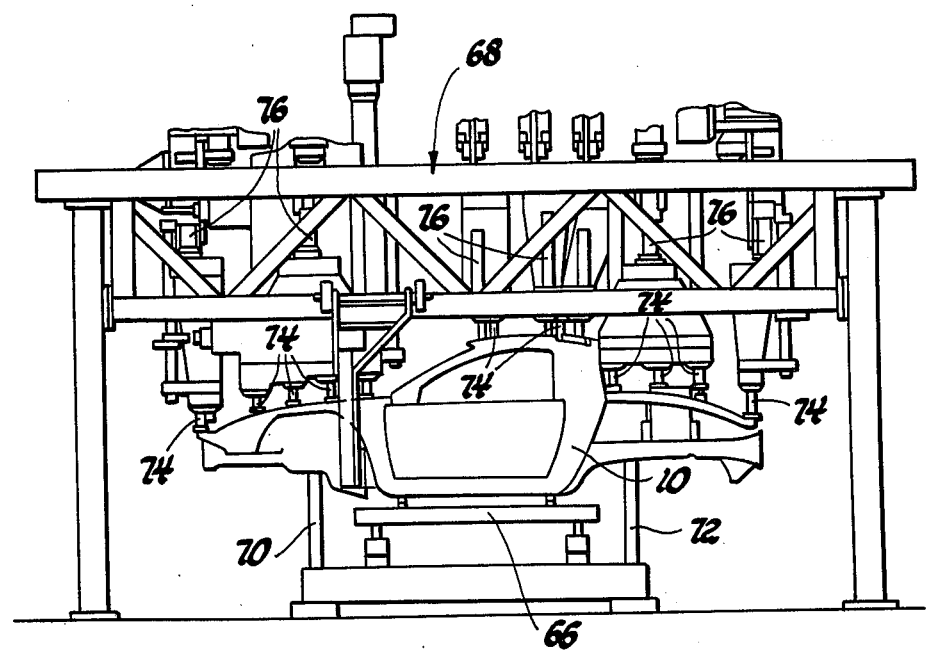
FIG. 7 is a side elevation view of a locating and machining fixture for positioning the vehicle body and milling and drilling the attachment blocks to a precise relationship relative one another.
Figure 8:
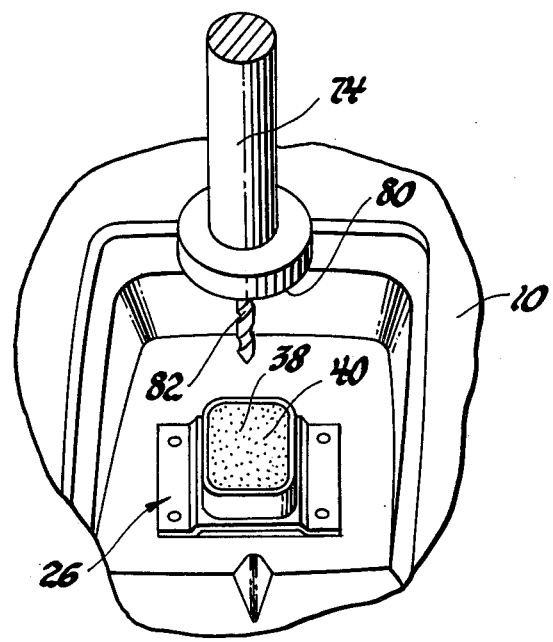
FIG. 8 is a perspective view showing a typical tool for milling and drilling an attachment block.

Referring to FIG. 7, there is shown a typical body structure 10 which is moved by a conveyor pedestal 66 or other suitable conveyance into a locating and machining fixture, generally indicated at 68. Fixture 68 includes precise locating elements 70 and 72 which precisely establish the body structure 10 within the fixture 68. Fixture 68 also includes a plurality of machining units 74 which are mounted upon hydraulic elevating units 76 for lowering the machining units 74 into machining contact with the attachment blocks 26 of the body structure 10. More particularly, as best seen in FIG. 8, each of the machining units 74 includes a milling cutter 80 which is lowered into contact with the panel support face 40 of the attachment blocks 26. Rotation of the milling cutter 80 spot faces both the cylindrical end face 34 of the attachment block housing 28 and also the curable plastic 38 filling the housing to provide a machined panel support face 40 which is located at a precise elevation relative the panel support face 40 of each of the other attachment blocks 26 carried by the body structure 10. Furthermore, the milling cutter 80 establishes the panel support face 40 at a precise planar orientation relative each of the other attachment blocks 26 so that the plastic panels substantially supported on the panel support faces 40 will not be twisted or bent from their undistorted conditions. The machining units 74 also have a drill 82 for drilling a fastener hole 86 through drilling field provided by the curable plastic 38. The drill 82 of each of the machining units 74 is located such that the fastener hole 86 drilled thereby will be precisely located relative the hole 86 drilled in each of the other attachment blocks 26. Accordingly, the plastic body outer panel subsequently attached thereto will be precisely located and spaced relative each of the adjacent plastic body outer panel attached to the other attachment blocks 26.

After the attachment blocks 26 of the body structure 10 are simultaneously milled and drilled to their precise dimensional relationship relative each of the other attachment blocks 26, the body structure 10 is conveyed from the locating and machining fixture 68. Subsequently, the various plastic panels are attached to the body structure 10. For example, as seen in FIG. 5, the fender 16 is positioned with its flange 50 overlying the attachment blocks 26. The screw 56 is driven through a ferrule 58 and into the hole 86 drilled in the attachment block 26. The screw 56 threads into the plastic filler 38 through the base 30 of the attachment block housing 28 and through the underlying sheet metal stamping of the body structure 10. The ferrule 58 acts between the head of the screw 56 and the flange 50 to distribute the attaching load over a more substantial area of the fender offset flange 50. The mounting face 52 of the underside of the fender flange 50 is established at the elevation defined by its engagement with the previously machined panel support face 40. Accordingly, the fender 16 is mounted at a precise height which will align its surface properly with the outer appearance surface of the adjacent body panels such as the front bumper fascia 12. Furthermore, the precise planar relationship between the body panels support faces 40 each of the attachment blocks upon which the fender 16 is supported will mate properly with the free state undistorted condition of the flexible fender 16 so that the fender 16 is not twisted, bent or otherwise distorted by the attaching action of the screws 56. Furthermore, the coaction between the screws 56, ferrule 58 and the holes 54 of the fender offset flange 50 will precisely locate the fender in the fore and aft and lateral directions by virtue of the precise drilling of the fastener holes 86 in the attachment blocks 26.

Figure 6:
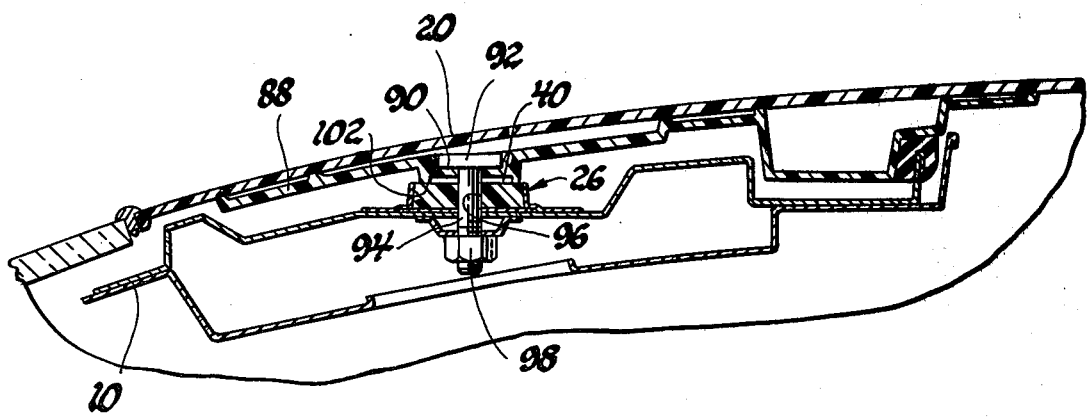
FIG. 6 is a sectional view showing the typical attachment of a double layer plastic body panel such as a vehicle roof on the body structure.

Referring to FIG. 6, there is shown a typical attachment of the roof cover 20 to the body structure 10. The roof cover 20 differs from the fender 16 in that the roof panel does not have a flange which is concealed beneath an adjacent body panel as the fender flange is concealed by the front compartment lid. Accordingly, the roof cover 20 includes a plastic inner reinforcement panel 88 which is adhesively or otherwise suitably secured to the roof cover 20. The plastic inner reinforcement panel 88 includes a recess 90 which nonrotatably seats the head 92 of a bolt 94. The bolt 94 is in turn inserted through a hole 96 of the attachment block 26 aligned therewith. A nut 98 is threadedly received upon the bolt 94 and holds the mounting face 102 of the plastic inner reinforcement panel 88 in supporting contact with the precisely machined panel support face 40 of the attachment block 26. Accordingly, the roof cover 20 is precisely secured on the body structure 10 in a precisely located and distortion free manner.

Thus, it is seen that the invention provides apparatus and method for the mounting of flexible plastic panels on an underlying vehicle body structure in a distortion free and precisely located manner which aligns and spaces adjacent panels relative one another.

It will be understood that the particular attachment block shown in FIGS. 2-5 hereof is a preferred example of the attachment block appropriate for use in this invention. This particular attachment block offers the advantage of a metal base 30 which facilitates projection welding onto the vehicle body structure 10 and a metal wall 32 which provides a column between the vehicle body structure 10 and the flange of the particular plastic body panel. The presence of this columnarly loaded side wall in conjunction with having the attaching screw 56 extending through the base 30 of the attachment block as well as through the underlying body structure 10 limits any tendency of the loosening of the plastic body panel which might be caused by creep in the curable plastic.

Alternative forms of attachment blocks may be used in conjunction with the disclosed method and apparatus for plastic body panel attachment. For example, the attachment block may be fashioned entirely of plastic and adhesively bonded to the vehicle body under structure. On the other hand, the attachment block could be a metal block which could be welded, bolted or adhesively secured to the vehicle body underlying structure. In either case the attachment block would have a support face 40 which would be machined to the appropriate height and would receive the attaching screw 56 or the attaching bolts 94.

The embodiments of the invention in which an exclusive property or privilege is claimed are defined as follows:

1. A vehicle body comprising:
 a vehicle body structural panel suitably connected to other vehicle body structural panels to provide a self-support body structure;
 a vehicle body outer panel having a generally planar apertured mounting surface adapted for attachment on the body structure in spaced relation from the body structural panels;
 an attachment block having a stamped metal housing with a base adapted for attachment on the body structural panel and a cylindrical projecting wall defining a plastic filled cavity, said cylindrical wall and said plastic being machinable to establish a precisely located body outer panel support face and said plastic being drillable to provide a fastener hole; and a fastener installed through the aperture of the body outer panel mounting surface and into the drilled hole in the plastic of the attachment block whereby the mounting surface of the body outer panel is securely attached to the support face of the attachment block to attach the body outer panel on the body frame.

2. An attachment block for attaching a vehicle body outer panel on a vehicle body structural panel comprising:

a stamped metal housing having a base adapted for attachment on the body structural panel and having a cylindrical wall projecting perpendicularly from the base and terminating at a cylindrical end face to define a cavity; and a curable plastic filling the container to the cylindrical end face and cooperating therewith to define a panel support face machinable to a precise height and providing a field for the drilling of a fastener hole and installation of a fastener to secure the body outer panel on the attachment block.

* * * * *

UNITED STATES PATENT AND TRADEMARK OFFICE
CERTIFICATE OF CORRECTION

PATENT NO. : 4,438,971
DATED : March 27, 1984
INVENTOR(S) : Wieslaw S. Zaydel

It is certified that error appears in the above—identified patent and that said Letters Patent is hereby corrected as shown below:

In the title page, "Inventors: Wieslaw S. Zaydel, Hulki Aldikacti, James G. Bouck" should read -- Wieslaw S. Zaydel --.

Signed and Sealed this

Twenty-sixth Day of November 1985

[SEAL]

Attest:

DONALD J. QUIGG

Attesting Officer

Commissioner of Patents and Trademarks